W. H. SODEAU.
MEANS FOR INCREASING ENERGY OF STORED COMPRESSED AIR OR OTHER GAS CAPABLE OF SUPPORTING COMBUSTION.
APPLICATION FILED JULY 18, 1910.
1,008,871.
Patented Nov. 14, 1911.
2 SHEETS—SHEET 1.
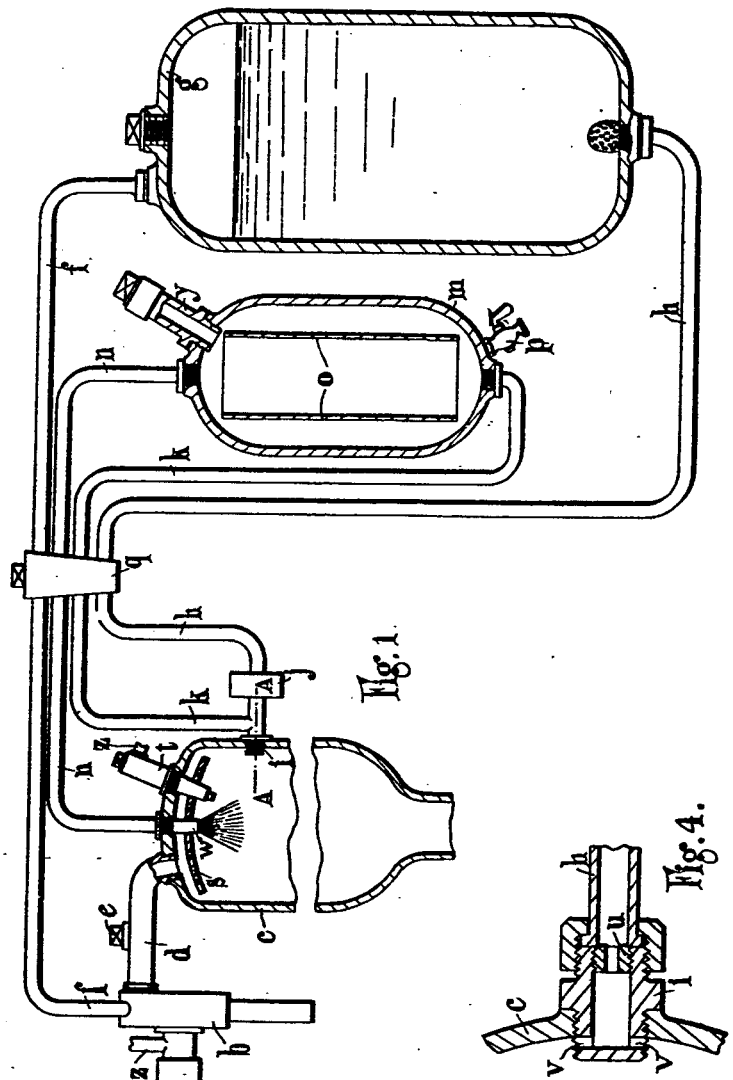

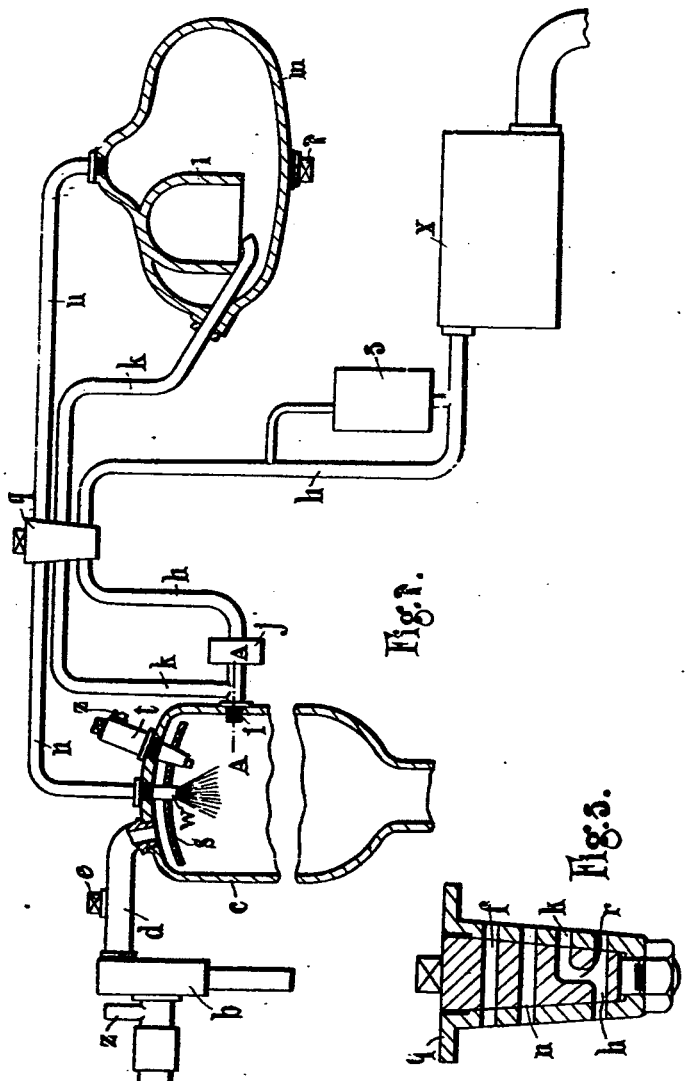

UNITED STATES PATENT OFFICE.

WILLIAM HORACE SODEAU, OF NEWCASTLE-UPON-TYNE, ENGLAND, ASSIGNOR TO SIR W. G. ARMSTRONG WHITWORTH & COMPANY LIMITED, OF NEWCASTLE-UPON-TYNE, ENGLAND.

MEANS FOR INCREASING ENERGY OF STORED COMPRESSED AIR OR OTHER GAS CAPABLE OF SUPPORTING COMBUSTION.

1,008,871. Specification of Letters Patent. Patented Nov. 14, 1911.

Application filed July 18, 1910. Serial No. 572,609.

*To all whom it may concern:*

Be it known that I, WILLIAM HORACE SODEAU, a subject of the King of Great Britain and Ireland, and residing at Elswick Works, Newcastle-upon-Tyne, in the county of Northumberland, England, have invented certain new and useful improvements in and relating to means for increasing the energy of stored compressed air or other gas capable of supporting combustion, of which the following is a specification.

This invention relates to heating apparatus such as is used in compressed air plant. In such plant it is known to increase the energy of compressed air by burning therein a liquid fuel and also to introduce water into the hot combustion products in order to reduce the temperature of the gases passing to the engine, and thus to enable an increased quantity of motive fluid to be made available without exceeding a suitable temperature. Should, however, the water supply for any reason fail, serious damage will be caused by the high temperature of the products of combustion.

The object of the present invention is to provide an apparatus of the above character, in which the disastrous effects resulting from the failure or variation of the water supply are avoided, and other advantages also obtained.

The invention consists for this purpose in making the feed of fuel into the combustion chamber dependent upon the supply of water or other vaporizable liquid into the products of combustion.

The invention also consists in connecting the fuel reservoir with the means supplying water or other vaporizable liquid into the products of combustion in such a manner that a definite part of the water or other liquid passing through said supply means is caused to enter said fuel reservoir and thus to displace the fuel into the combustion chamber the pressure of the said water being utilized for spraying the fuel when desired.

By this invention, it will be seen, that not only are the disastrous effects resulting from failure of the water or other liquid supply avoided, but also that the rate of feed of fuel into the combustion chamber can be made directly proportional to the rate of supply of water into the products of combustion. Thus variations in the ratio of fuel to water are avoided and the best proportion maintained.

The invention further consists in the improved heating apparatus and in details thereof as hereinafter indicated.

Referring now to the accompanying drawings:—Figures 1 and 2 represent diagrammatically two methods of carrying the invention into effect. Fig. 3 represents a form of safety cock in which the connection from the water conduit to the fuel reservoir is made in the cock itself. Fig. 4 is a part sectional view (on the line A—A of Fig. 1 or 2) of the water distributing device shown in those figures.

In carrying this invention into effect according to one method as suitable for a torpedo and in which water is fed from a reservoir as shown in Fig. 1, the compressed air is fed from the storage tank, $a$, past a reducing valve, $b$, and thence to a combustion chamber, $c$, through a conduit, $d$, which causes a drop of pressure to take place in the air stream, such as may be produced or increased, for example by a perforated plate or other suitable resisting means placed within it as indicated at $e$. This conduit or that part of it which causes the drop of pressure will hereinafter be referred to as the "restriction", $e$. A connection, $f$, is taken from between the reducing valve, $b$, and the restriction, $e$, in the pipe, $d$, conveying the air to the combustion chamber to the top of a tank, $g$, containing a vaporizable liquid which will hereinafter be referred to as water. From the bottom of the water containing tank $g$ a pipe, $h$, conveys the water to a suitable jet or distributing device, $i$, placed for example, in the side of the combustion chamber, $c$. A strainer $j$, is preferably provided in the pipe, $h$, to guard against blockage of the jet, $i$. It will be seen that the water is fed into the combustion chamber $c$ by the difference of pressure occasioned by the restriction $e$ in the air supply pipe, $d$, to the combustion chamber $c$. Intermediate between the water tank, $g$, and the jet or other spraying device, $i$, is placed a connection, $k$, leading to the bottom of a fuel reservoir, $m$. Part of the water therefore passing along the supply pipe, h, to the combustion chamber, c, is diverted along this connection to enter the fuel chamber, m, and thus fuel is forced from the top of the container and passes through a pipe, n, into the combustion chamber, c, by means of a suitable jet or distributing device, w. The spraying of the fuel may of course be assisted by means on an air stream if desired. The end of the pipe, k, which conveys the water into the lower end of the fuel reservoir m, may be appropriately shaped or baffled so that the entering water does not tend to become mixed with the fuel, and further appropriate baffles, o, may be placed in the reservoir, m, to prevent the water and fuel from being churned up from the rolling of the torpedo. The fuel reservoir, m, is also provided with suitable means such as the cock p, for draining off the water and also for refilling it with fuel, such as the plug, y, the fuel and vaporizable liquid being such that they do not tend to mix with one another.

As shown in Fig. 1, the pipe, f, conveying the air to the water tank and the pipe, h, conveying the water therefrom to the combustion chamber and the pipe, k, leading the water to the bottom of the fuel reservoir and the pipe, n, conveying the fuel from the top of the reservoir to the combustion chamber may all be arranged to be controlled by a single safety cock, q, or the like. In such a case I may arrange, if desired, that the connection between the water supply to the combustion chamber and to the fuel reservoir may take place through a passage, r, in the cock, q, as shown in Fig. 3, and I then place a strainer between the water tank, g, and the cock, q, and with this arrangement the strainer, j, may be retained or dispensed with as desired. The feed of water into the combustion chamber may be obtained in any appropriate manner, for example, by the methods described for feeding in fuel in British Patent No. 3495 of 1905 and U. S. Patent No. 944,975 or as described for both water and fuel in application Serial No. 412,921. The combustion chamber, c, may be provided with a deflector plate, s, and with a primer t, according to the before mentioned Patent No. 944,975, (the pipe, z, supplying air to the primer is not shown in full for the sake of clearness) and the restriction, e, placed in the pipe, d, may be dispensed with and the necessary drop of pressure obtained by suitably shaping the deflector plate, s, as set forth in that specification or by reducing the diameter of the pipe, d. The water before being discharged into the combustion chamber, c, through any appropriate jet or spray nozzle, i, may if desired be led through a vaporizing coil as described in my specification Serial No. 412,921. The form of jet or spraying device which I prefer is shown in Fig. 4 and it will be seen that the water is introduced in the form of one or more jets the direction of which is more or less tangential to the surface of the combustion chamber, c. The passage for the water is restricted as shown at, u, and the desired energy of discharge to give a good distribution around the walls of the combustion chamber is obtained by suitably proportioning the areas of the discharge holes, v, and of this restriction, u. When this form of distributing device is used as shown, with a combustion chamber having a deflecting plate, s, according to my Patent No. 944,975, I prefer to arrange that this deflector shall give a good rapid stream of air along the walls of the combustion chamber. This distributing device may be carried by any part of the combustion chamber as may be convenient.

It will be noticed that should air for any reason enter the fuel reservoir, m, instead of water, then this air will bubble up through the fuel, pass along to the combustion chamber by the pipe, n, and thus extinguish the fuel flame. It is not essential however that the fuel reservoir, m, should be completely full as water from the tank, g, would flow into the fuel reservoir at a very great rate as soon as air is admitted to the water tank, g. Thus the air in the top of the fuel reservoir, m, would be rapidly compressed and ejected through the jet, w. If desired the water may be introduced into a separate evaporating chamber instead of directly into the combustion chamber, c. The flow of fuel into the combustion chamber, c, may be controlled by the resistance of the spray, w, or other obstacle in the fuel conduit, n, or by throttling the pipe, k, leading the water into the fuel reservoir.

In a modification as shown in Fig. 2, I draw the water supply from the sea or from a supply carried in the torpedo by means of a pump, x, driven by the engine or independently. When sea water is used an anti-corrosive substance such as an alkaline carbonate or hydroxid should be introduced, preferably by feeding a solution of the same into the combustion chamber, c, or other suitable place, by any appropriate method such as already described in connection with the feeding of water. I may however, as shown in Fig. 2, arrange that a part of the sea water shall be diverted through a vessel or tank, 3, containing an anti-corrosive liquid or soluble solid, a suitable arrangement of cocks may be provided for regulating the flow through this vessel. If the water is fed from a tank it is preferable to introduce any such anti-corrosive substance directly into the tank itself. A safety cock, q, is also provided to control the pipes, h and n, together with h, if desired, and the connection between the pipes h and k, may take place through the cock as described in connection with Fig. 3. The pump may be provided with relief valves or other suitable devices (not shown in the drawings) for regulating the pressure of the water. It will be seen, that, when the water is thus fed by means of a pump, a large air space in the top of the fuel reservoir may produce a misfire unless the pump, $x$, has a very large capacity. As the water supply is limited any such space would take a considerable time to dispose of and meanwhile compressed air would be flowing backward through the water and fuel jets ($i$ and $w$) and would have to be subsequently expelled before ignition could take place. In order to overcome these difficulties I prefer to use a fuel reservoir as shown in Fig. 2. Here it will be seen that the pipe, $k$, which conveys the water into the fuel reservoir, $m$, opens beneath the bell, 1. Thus air passing along through the jet, $i$ and pipe, $k$, would be caught in the bell, 1, and would not be able to bubble through the fuel and subsequently pass back to the combustion chamber. Any air therefore contained in the top of the fuel flask would be rapidly expressed therefrom and the feed of fuel quickly established. In order that the bell, 1, may be completely filled the fuel reservoir is preferably filled in an inverted position through the plug, 2. The above difficulties could also be overcome by the use of a bag within the fuel reservoir and so to separate the water from the fuel which could be led either to the inside or the outside of this bag. By this separation air passing along the water supply pipe into the reservoir would be prevented from passing on to the fuel jet. The fuel will be fed by the collapse or expansion of the bag depending upon whether fuel or water is within it.

If from any cause the pump should draw in air instead of water, this air will occupy a very small volume after compression and will therefore expel but little fuel from the fuel flask. If the pump breaks down the fuel supply immediately ceases.

It will be seen that by the present invention the feed of fuel is absolutely dependent upon the flow of water into the combustion chamber or other evaporating chamber. Thus should any blockage such as might be caused by freezing occur in the pipe, $h$, conveying the water to the combustion chamber between the water tank, $g$, and the point at which the connection, $k$, is made to the fuel reservoir, it will be seen that no fuel is fed. A similar result follows a burst pipe in the water system. If in the arrangement shown in Fig. 1 the water tank, $g$, is not filled or the supply from any cause becomes exhausted, air instead of water passes through to the combustion chamber, $c$, and also into the fuel reservoir, $m$, where it rises through the fuel and passes along the pipe, $n$, to the combustion chamber as already explained. Thus again the feed of fuel is stopped upon failure of the water supply. The disastrous results which would be occasioned by the high temperature of the gases without the cooling by the introduction of water or other vaporizable liquid are thus avoided. Further as the latent heat of steam is very large and its specific heat greater than that of air, the amount of heat taken up by the air is very small compared with that absorbed by the water and hence variations in the ratio of fuel to air are of much less importance than are variations in the ratio of fuel to water.

It will be seen that according to the present invention the rate of the flow of fuel is directly dependent upon the rate of flow of the water or other vaporizable liquid and hence the proportion of fuel to water is maintained substantially constant. I can thus obtain the maximum amount of energy from the given store of compressed air or other gas supporting the combustion by burning in it as much fuel as possible and feeding into the products of combustion a definite amount of water to reduce the temperature to a utilizable degree.

The ratio of fuel to water depends, of course, upon the relative resistances of the two systems, reckoned from the point at which the pipe $k$, conveying water to the fuel reservoir, $m$, is connected to the main water conduit, $h$, as the difference of pressure which is used to feed the fuel is the same as that by which the water is forced through the terminal portion of the water system. The resistances of either or both of these systems can be made adjustable, and thus any desired ratio between fuel and water can be obtained.

It will be seen that many modifications may be made in the method of carrying this invention into effect without in any way departing from the spirit of the same.

Having now described my invention, what I claim as new and desire to secure by Letters Patent is:—

1. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber.

2. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, and means whereby the air is fed into the said chamber at a pressure less than that of the liquid supply.

3. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, and means for closing simultaneously the conduits supplying fuel and vaporizable liquid to said chamber.

4. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, means whereby air is fed into the said chamber at a pressure less than that of the vaporizable liquid supply and means for closing simultaneously the conduits supplying fuel and vaporizable liquid to said chamber.

5. Apparatus for increasing the energy of stored compressed air comprising in combination an air reservoir, a fuel reservoir, and a supply of vaporizable liquid, a combustion chamber and ignition means therein, said vaporizable liquid on its passage to the combustion chamber being divided into two streams one of which displaces from the fuel chamber an amount of fuel which bears a constant ratio to the amount of vaporizable liquid flowing directly to the combustion chamber.

6. Apparatus for increasing the energy of stored compressed air, comprising in combination an air reservoir, a fuel reservoir and a supply of vaporizable liquid, a combustion chamber, means whereby said liquid is fed into the combustion chamber by pressure, and means whereby the air is fed into the combustion chamber at a pressure less than that of the vaporizable liquid supply, the vaporizable liquid on its passage to the combustion chamber being divided into two streams one of which displaces from the fuel chamber an amount of fuel proportional to the amount of vaporizable liquid flowing directly to the combustion chamber, and means for closing simultaneously the conduits supplying fuel and vaporizable liquid to said chamber.

7. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, means for distributing the fuel into said chamber and means for admitting said air to the chamber at a pressure less than that of the liquid in the vaporizable liquid supply.

8. Apparatus for increasing the energy of stored compressed air, comprising in combination an air reservoir, a combustion chamber, a fuel reservoir and a supply of vaporizable liquid under pressure, connections between said fuel liquid and air reservoirs respectively to the combustion chamber, means in said connections simultaneously closing the conduits supplying the vaporizable liquid and fuel, the vaporizable liquid on its passage to the combustion chamber being divided into two streams one of which displaces from the fuel chamber an amount of fuel which bears a constant ratio to the amount of vaporizable liquid flowing directly to the combustion chamber, means for distributing the fuel into said chamber and means admitting the compressed air to the chamber at a pressure less than that of the liquid in the vaporizable liquid supply.

9. Apparatus for increasing the energy of stored compressed air, comprising in combination a fuel reservoir and a supply of vaporizable liquid under pressure, an air reservoir, a combustion chamber into which the air is fed at a pressure less than that of said vaporizable liquid supply, a pipe connection from the vaporizable liquid supply to the combustion chamber, another pipe connection branching from the former and leading to the fuel reservoir and a pipe connection from the fuel reservoir to the combustion chamber whereby an amount of fuel which bears a constant ratio to the amount of vaporizable liquid flowing to the combustion chamber is displaced from the fuel reservoir and passes to the combustion chamber.

10. Apparatus for increasing the energy of stored compressed air, comprising in combination a fuel reservoir and a supply of vaporizable liquid under pressure, an air reservoir, a combustion chamber into which the air is fed at a pressure less than that of said vaporizable liquid supply, a pipe connection from the vaporizable liquid supply to the combustion chamber, another pipe connection branching from the former and leading to the fuel reservoir, a pipe connection from the fuel reservoir to the combustion chamber, and means simultaneously closing the conduits supplying fuel and vaporizable liquid to the combustion chamber whereby an amount of fuel which bears a constant ratio to the amount of vaporizable liquid flowing to the combustion chamber is displaced from the fuel reservoir and passes to the combustion chamber.

11. Apparatus for increasing the energy of stored compressed air, comprising in combination a fuel reservoir and a supply of vaporizable liquid under pressure, an air reservoir, a combustion chamber into which the air is fed at a pressure less than that of said vaporizable liquid supply, a pipe connection from the liquid supply to the combustion chamber and another pipe connection branching from the former and leading to the fuel reservoir, a pipe connection from the fuel reservoir to the combustion chamber, means at the chamber end of the latter connection for spraying the fuel into the chamber and ignition means in the combustion chamber whereby a constant proportion of the vaporizable liquid flowing toward the combustion chamber is diverted along the branch connection and displaces from the fuel reservoir an amount of fuel which bears a constant ratio to the amount of vaporizable liquid supplied to the combustion chamber.

12. Apparatus for increasing the energy of stored compressed air, comprising in combination a fuel reservoir and a supply of vaporizable liquid, an air reservoir, a connection between the air reservoir and the combustion chamber, means placed in said connection for reducing the pressure of the air below that of the vaporizable liquid supply before the air is admitted to the combustion chamber, pipe connections between the vaporizable liquid supply and the combustion chamber, another pipe connection branching from the former and leading to the fuel reservoir, a pipe connection between the fuel reservoir and the combustion chamber, whereby a constant proportion of the vaporizable liquid flowing toward the combustion chamber is diverted along the branch connection and displaces from the fuel reservoir an amount of fuel which bears a constant ratio to the amount of vaporizable liquid supplied to the combustion chamber.

13. Apparatus for increasing the energy of stored compressed air, comprising in combination a fuel reservoir and a supply of vaporizable liquid, an air reservoir, a connection between the air reservoir and the combustion chamber, means placed in said connection for reducing the pressure of the air below that of the vaporizable liquid supply before the air is admitted to the combustion chamber, a pipe connection between the vaporizable liquid supply and the combustion chamber, another pipe connection branching from the former and leading to the fuel reservoir, a pipe connection between the fuel reservoir and the combustion chamber, means simultaneously closing the conduits supplying fuel and vaporizable liquid to the combustion chamber, means for distributing said fuel and jet means admitting vaporizable liquid to the combustion chamber whereby a constant proportion of the vaporizable liquid flowing toward the combustion chamber is diverted along the branch connection and displaces from the fuel reservoir an amount of fuel which bears a constant ratio to the amount of vaporizable liquid supplied to the combustion chamber.

14. Apparatus for increasing the energy of stored compressed air, comprising in combination a fuel reservoir and a supply of vaporizable liquid, an air reservoir, a connection between the air reservoir and the combustion chamber, means placed in said connection for reducing the pressure of the air below that of the vaporizable liquid supply before the air is admitted to the combustion chamber, a pipe connection between the vaporizable liquid supply and the combustion chamber, another pipe connection branching from the former and leading to the fuel reservoir, a pipe connection between the fuel reservoir and the combustion chamber, an air collecting bell placed over the entrance of the branch pipe connection into the fuel reservoir, whereby a constant proportion of the vaporizable liquid flowing toward the combustion chamber is diverted along the branch connection and displaces from the fuel reservoir an amount of fuel which bears a constant ratio to the amount of vaporizable liquid supplied to the combustion chamber.

15. Apparatus for increasing the energy of stored compressed air, comprising in combination a fuel reservoir and a supply of vaporizable liquid, an air reservoir, a connection between the air reservoir and the combustion chamber, means placed in said connection for reducing the pressure of the air below that of the vaporizable liquid supply before the air is admitted to the combustion chamber, a pipe connection between the vaporizable liquid supply and the combustion chamber, another pipe connection branching from the former and leading to the fuel reservoir, a pipe connection between the fuel reservoir and the combustion chamber, a collecting bell placed over the entrance of said branch connection within the fuel reservoir, means simultaneously controlling the supply of fuel and vaporizable liquid to the combustion chamber, whereby a constant proportion of the vaporizable liquid flowing toward the combustion chamber is diverted along the branch connection and displaces from the fuel reservoir an amount of fuel which bears a constant ratio to the amount of vaporizable liquid supplied to the combustion chamber.

16. Apparatus for increasing the energy of stored compressed air comprising in combination a combustion chamber into which said air is admitted, a fuel reservoir and a supply of sea-water, said water on its passage to the combustion chamber being divided into two streams one of which displaces from the fuel chamber an amount of fuel which bears a constant ratio to the amount of sea-water flowing directly to the chamber.

17. Apparatus for increasing the energy of stored compressed air comprising in combination an air reservoir, a combustion chamber to which said air is admitted, and a fuel reservoir connected thereto, a supply of sea-water and means whereby the sea-water on its passage to the combustion chamber is divided into two streams one of which displaces from the fuel chamber an amount of fuel which bears a constant ratio to the amount of sea-water flowing directly to the said chamber, and means for introducing an anti-corrosive substance which neutralizes the effects of chemical action between the hot fluids and the sea-water.

18. Apparatus for increasing the energy of stored compressed air, comprising in combination an air reservoir, a fuel reservoir and a supply of vaporizable liquid, a combustion chamber to which said air is admitted at a pressure less than that of the liquid in the vaporizable liquid supply, means for pumping the vaporizable liquid into the combustion chamber, said vaporizable liquid on its passage to the said chamber being divided into two streams, one of which displaces from the fuel chamber an amount of fuel which bears a constant ratio to the amount of vaporizable liquid flowing directly to the chamber, and means for introducing an anti-corrosive substance into the vaporizable liquid thereby neutralizing the effects of chemical action between the hot fluids and vaporizable liquid.

19. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, and means for introducing the vaporizable liquid into the combustion chamber in a direction substantially at right angles to the radius of curvature of the inner surface of the chamber at the point of introduction thereto.

20. Apparatus for increasing the energy of stored compressed air comprising in combination a combustion chamber into which said air is admitted, a fuel reservoir and a supply of vaporizable liquid, said vaporizable liquid on its passage to the combustion chamber being divided into two streams one of which displaces from the fuel chamber an amount of fuel proportional to the amount of vaporizable liquid flowing directly to the combustion chamber, and means for introducing the vaporizable liquid into the combustion chamber in a direction substantially at right angles to the radius of curvature of the inner surface of the chamber at the point of introduction thereto, said means consisting in a tube having a restricted passage and terminating in perforations arranged normally in said passage.

21. Apparatus for increasing the energy of stored compressed air comprising in combination, an air reservoir, a fuel reservoir and a vaporizable liquid supply, a combustion chamber, ignition means in said combustion chamber, a connection between said air reservoir and the combustion chamber, means placed in said connection for reducing the pressure of said air below that of the liquid in the vaporizable liquid supply before the air is admitted to the combustion chamber, a connection from the vaporizable liquid supply to the combustion chamber and a branch connection from the latter connection to the fuel reservoir, a connection between said fuel reservoir and the combustion chamber, means simultaneously closing the conduits supplying fuel and vaporizable liquid to said combustion chamber, means for distributing said fuel and jet means admitting the vaporizable liquid to said combustion chamber, whereby the pressure in the vaporizable liquid supply causes the liquid to flow to the combustion chamber, some of this vaporizable liquid being diverted through said branch connection and displacing the fuel in the fuel reservoir which then flows to the combustion chamber, means for causing the vaporizable liquid to be introduced into said combustion chamber in a direction substantially at right angles to the radius of curvature of the inner surface of the chamber at the point of introduction thereto, said means comprising a tube having a passage therein terminating in perforations arranged normally to said passage.

22. Apparatus for increasing the energy of stored compressed air comprising in combination, an air reservoir, a fuel reservoir and a vaporizable liquid supply, a combustion chamber, ignition means in said chamber, a connection between said vaporizable liquid supply and the combustion chamber, means placed in said connection for reducing the pressure of the air below that of the liquid in said vaporizable liquid supply before the air is admitted to said chamber, another connection branching from the before-mentioned connection to the fuel reservoir, a connection between said fuel reservoir and combustion chamber, an air collecting bell within said fuel reservoir placed over the entrance of said branch connection, means for simultaneously closing the conduits supplying fuel and vaporizable liquid to the combustion chamber so that some of the vaporizable liquid passing to the combustion chamber is diverted to the fuel reservoir thereby displacing the fuel which then flows to the combustion chamber, means for causing the vaporizable liquid to be introduced into said combustion chamber in a direction substantially at right angles to the radius of curvature of the inner surface of the chamber at the point of introduction thereto, said means comprising a tube having a passage therein terminating in perforations arranged normally to said passage.

In testimony whereof, I affix my signature in presence of two witnesses.

WILLIAM HORACE SODEAU.

Witnesses:
C. MEICHSNER,
S. R. v. POSSL.